March 11, 1952 — R. F. DAY — 2,588,489

TILTING APPARATUS

Filed July 19, 1949 — 2 SHEETS—SHEET 1

INVENTOR.
Richard F. Day
BY McLaughlin & Wallenstein
Attys.

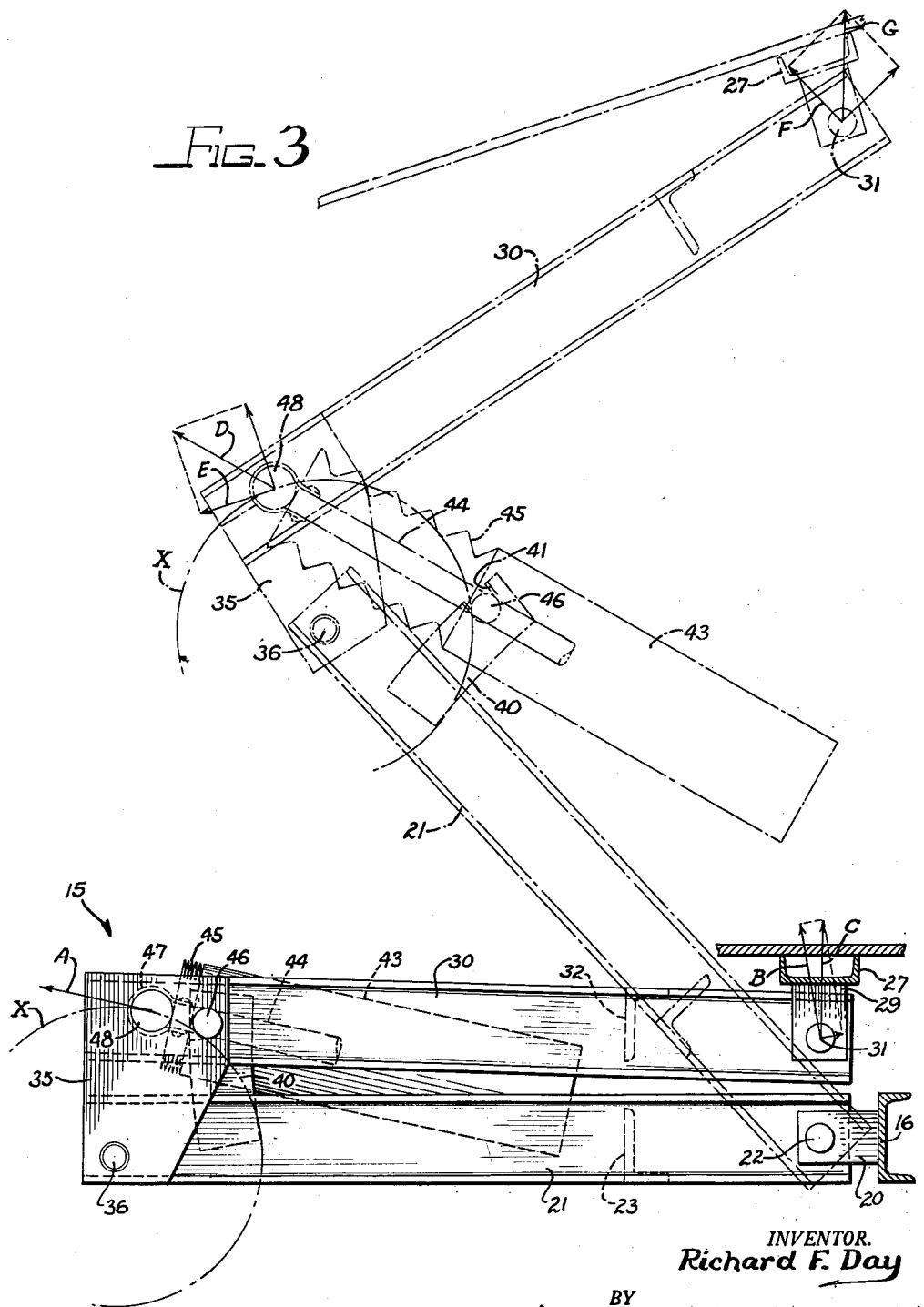

Patented Mar. 11, 1952

2,588,489

UNITED STATES PATENT OFFICE 2,588,489

TILTING APPARATUS

Richard F. Day, Chicago, Ill.

Application July 19, 1949, Serial No. 105,569

8 Claims. (Cl. 298—22)

This invention is directed to an apparatus for tilting the dump body of a dump vehicle wherein the dump body is pivotally mounted on the chassis of the vehicle.

The principal object of this invention is to provide an improved apparatus of this type wherein maximum power is provided at the beginning of the dumping operation when the dump load is the greatest and wherein maximum tilting of the dump body is provided with substantially no decrease in dumping power during the dumping operation.

In carrying out this object of the invention the tilting apparatus preferably includes a pair of levers each having a pivotal connecting means at one end for pivotally connecting one lever to the vehicle chassis and the other to the dump body. The free ends of the two levers are connected together by a pivotal connection. Power means including two relatively movable parts are utilized for extending and collapsing the levers for performing the dumping operations. One of the levers carries a pivot means adjacent the free end thereof for pivotally mounting one of the parts of the power means thereon. This pivot means is offset from a line extending through the pivotal connection and the pivotal connecting means of that lever and in a direction away from the other lever. The other lever also carries a pivot means adjacent its free end for pivotally mounting the other part of the power means thereon. This latter pivot means is also offset from a line extending through the pivotal connection and the pivotal connecting means of this lever but in a direction toward the other lever. By reason of the offset relation of the pivot means, the power means may lie between and generally parallel to the levers when they are collapsed.

The angular relationship between a line between the pivot means on the two levers and a line between one of the pivot means and the pivotal connection between the two levers is substantially a right angle when the two levers are collapsed. In other words, the line of force between the two pivot means is substantially tangential to a circle with the pivotal connection as a center when the levers are collapsed. Thus, maximum lever extending torque is provided at the beginning of the dumping operation when the dumping load is greatest. Preferably the distance between the two pivot means is less than the distance between one of the pivot means and the pivotal connection when the levers are collapsed. Because of this angular relation and because the pivot means for the parts of the power means are offset and because of the spacing between the pivot means and the pivotal connection, the power means is maintained between the levers and maximum angular extension of the levers is provided with a minimum decrease in the angular relation and hence with a minimum decrease in lever extending power during the dumping operation.

As the dump body is being tilted during the dumping operation, the angular relation between vertical and the lever pivotally connected to it is being increased so that a given rotative force applied to the lever results in a greater lifting or tilting force applied to the dump body. This operates at least partially to compensate for the decrease in lever extending force, and, if desired, may fully compensate therefor. Thus, maximum dumping power is substantially provided throughout the dumping operation.

Further objects of this invention reside in the details of construction of the tilting apparatus and the cooperative relationship between the component parts thereof.

Other objects and advantages of this invention will become apparent to those skilled in the art upon reference to the accompanying specification, claims, and drawings, in which:

Fig. 3 is a side elevational view of the tilting apparatus shown in collapsed position and shown in broken lines in partially extended position.

Figure 2:
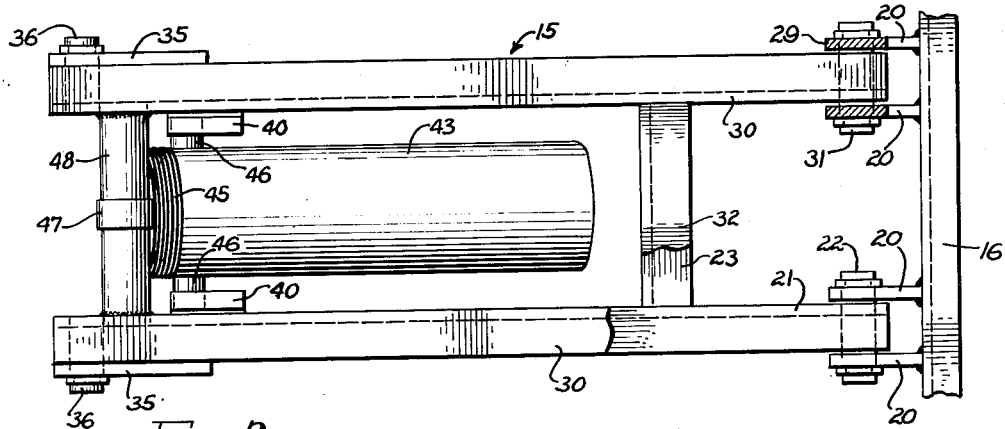
Fig. 2 is a top plan view of the tilting apparatus shown in collapsed position with parts broken away for clarity.
Figure 1:
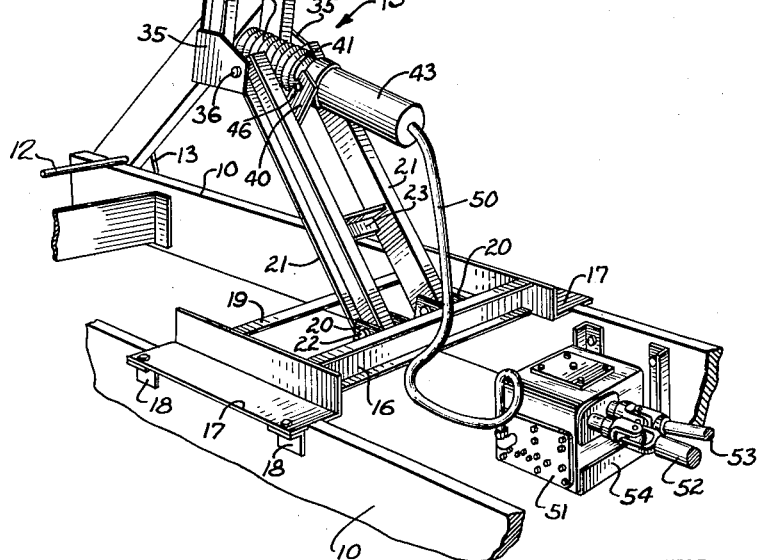
Figure 1 is a partial perspective view of the tilting apparatus of this invention applied to a dump vehicle and shown in dumping position.

Referring first to Fig. 1, the chassis of the dump vehicle is indicated at 10 and the frame of the dump body is indicated at 11. The dump body frame is pivoted to the chassis by a pivot rod 12 carried by brackets 13. Thus the dump body is pivotally mounted on the chassis of the vehicle for the dumping operation.

The tilting apparatus for performing the dumping operation is generally designated at 15. It includes a member 16 secured to angles 17, which in turn are secured to the chassis 10 by means of brackets 18. A bracing angle 19 extending between the angles 17 may be utilized for strengthening the assembly. Two pairs of brackets 20 are suitably secured to the member 16 for supporting a lever formed of a pair of channels 21. The lever is pivotally mounted on the brackets 20 by means of pivot pins 22. The two channels 21 forming the lever may be reinforced by a cross angle 23 secured thereto.

A member 27 is suitably secured to the frame 11 of the dump body by brackets 28. The member 27 carries two pairs of brackets 29 for carrying another lever formed of a pair of channels 30. The channels 30 are pivotally mounted on the brackets 29 by pivot pins 31. The channels 30 forming the second lever may be reinforced by a suitable angle 32.

The free ends of the lever 30 are provided with a pair of ears 35 which in turn receive pivot pins 36 carried by the channels 21 of the first lever. In this way the two levers, which are pivotally mounted to the chassis and dump body, have their free ends pivotally connected together. Although separate ears 35 have been illustrated for receiving the pivot pins 36, of course the levers 30 and ears may be integral in construction.

The other lever 21 carries a pair of brackets 40 which are provided with pivot slots 41. The pivot slots 41 are offset from a line extending through the pivot pins 22 and 36 and in a direction toward the other lever 30. While separate brackets 40 have been illustrated, of course these brackets may be integral with the lever 21.

A power means having two relatively movable parts is interposed between the two levers 21 and 30 for the purpose of angularly extending and collapsing these levers. The power means may be a conventional fluid motor consisting of a cylinder 43 for operating a piston rod 44, with the end of the piston rod and cylinder being sealed by a suitable bellows 45. The end of the cylinder 43 adjacent the piston rod 44 is provided with a pair of pivot pins 46 received in the pivot slots 41 of the brackets 40 so that the forward end of the cylinder 43 is pivotally mounted on the lever 21. The piston rod 44 carries a strap 47 which is pivotally mounted on a pin 48 secured to the channels of the lever 30. It is here noted that the pin 48 carried by the lever 30 is offset from a line extending through the pivot pins 36 and 31 and in a direction away from the other lever 21. The power means lies between and substantially parallel to the two levers when the tilting apparatus is collapsed.

As the power means is operated the levers 21 and 30 are angularly extended and collapsed in a manner to be pointed out more particularly hereafter. At all times the power means is maintained between the two levers so that the tilting apparatus requires only a minimum of space. Fluid for operating the power means is conveyed to the cylinder 43 by a flexible tube 50 extending from a hydraulic unit 51 connected by shafts 52 and 53 to a suitable power takeoff and a control in the vehicle. The hydraulic unit may be secured to the chassis of the vehicle by means of brackets 54. When it is desired to operate the power means the power takeoff and control are suitably operated to cause the hydraulic unit 51 to supply fluid to the cylinder 43 of the power means for dumping purposes and to withdraw fluid therefrom for collapsing purposes.

Referring particularly to Fig. 3, it is seen that the pivot pins 46 for pivotally mounting one part of the power means on the lever 21 are offset from a line extending through the pivot pins 22 and 36 and in a direction toward the lever 30. It is also seen that the pivot pin 48 for mounting the other part of the power means on the lever 30 is offset from a line passing through the pivot pins 31 and 36 and in a direction away from the lever 21. When the levers 21 and 30 are collapsed, as indicated in solid lines in Fig. 3, the angular relation between the pivot pins 46, 48, and 36 is substantially a right angle and the line of force between the pivot pins 46 and 48 is substantially tangent to a circle X with pivot pin 36 as its center. Thus in this collapsed position of the levers 21 and 30 the force supplied to the pivot pin 48 is at substantially right angles to the lever arm between the pivot pins 48 and 36. In other words, all of the force is directed along the vector A tangent to the circle X about the pivot pin 36 as the center. Therefore, in the collapsed position of the levers 21 and 30 the force for angularly extending the levers is at a maximum. When the levers are collapsed, the distance between the pivot pins 46 and 48 is preferably less than the distance between the pivot pins 48 and 36 and should be made as small as possible for best results. As illustrated the former distance is less than half the latter distance.

The rotative force thus applied to the lever 30 when in the collapsed position, which is utilized for the purpose of tilting the dump body, is indicated by the vector B. The vertical force for tilting the dump body is indicated by the vector C.

Referring now to the parts of the tilting apparatus as shown in broken lines in Fig. 3 wherein the dump body is partially tilted, the force for angularly extending the levers 21 and 30 is indicated by the vector D which is equal to the vector A. The actual force for angularly extending the levers 21 and 30 in this position is indicated by the vector E, tangent to the circle X, which is somewhat less than vector D. Thus as the levers 21 and 30 are angularly extended the force causing the angular extension of the levers gradually decreases. Since, however, the pivot pins 46 and 48 are offset with respect to the pivot pins 36, 22 and the pivot pins 36, 31 respectively, and since the pivot pins 46 and 48 were closely spaced when the levers were collapsed, maximum angular extension of the levers 21 and 30 is provided with a minimum decrease in the angular relation between the pivot pins 46, 48 and 36. The closer the spacing between the pivot pins 48 and 46 with respect to the spacing between the pivot pins 48 and 36 the less becomes the decrease in angular relation between the pivot pins 46, 48 and 36. Accordingly maximum angular extension of the levers 21 and 30 is provided with a minimum decrease in the lever extending force during the dumping operation.

The angular force present at the pivot pin 31 for performing the dumping operation is indicated by the vector F and the relationship between the quantitive values of the vectors F and B is proportional to the relation between the vectors E and A respectively. The actual force provided by the pins 41 for performing the tilting operation is indicated by vector G and the quantitive value thereof is greater than vector F. Thus as the levers 21 and 30 are angularly extended the tilting force exerted by the pivot pin 31 gradually increases and operates to compensate for the decrease in the force angularly extending the levers 21 and 30. The compensation is at least partial and may well be arranged to be full so that maximum dumping power is substantially provided throughout the entire dumping operation.

The tilting apparatus of this invention, therefore, operates to provide maximum dumping force at the beginning of the dumping operation and operates to provide substantially maximum dumping force throughout the complete dumping operation. Because of this feature of applicant's invention, the tilting apparatus, including power means, may be lighter and more compact in construction and therefore less expensive to manufacture than heretofore. The tilting apparatus of this invention may be utilized as original equipment on dump vehicles or may be utilized as an attachment for conventional vehicles to convert the same to dump vehicles. The tilting apparatus of this invention is particularly adaptable as an adapter for converting conventional vehicles into dump vehicles for it may be collapsed into very small vertical dimensions and yet be extended to large vertical dimensions for dumping purposes, it being understood that ordinarily there is very little room between the chassis and the body of a conventional vehicle.

While for purposes of illustration one form of this invention has been disclosed, other forms thereof may become apparent to those skilled in the art upon reference to this disclosure, and, therefore, this invention is to be limited only by the scope of the appended claims.

I claim as my invention:

1. Apparatus for tilting the dump body of a dump vehicle wherein the dump body is pivotally mounted on the chassis of the vehicle comprising, a first lever, a second lever, pivotal connecting means at one end of one of the levers adapted to pivotally connect that lever to the vehicle chassis, pivotal connecting means at one end of the other lever adapted to pivotally connect that lever to the dump body, a pivotal connection between the free ends of the two levers, power means having two relatively movable parts, pivot means on the first lever adjacent the free end thereof and offset from a line extending through the pivotal connection and pivotal connecting means of that lever and in a direction away from the second lever for pivotally mounting one of the parts of the power means thereon, and pivot means on the second lever adjacent the free end thereof and offset from a line extending through the pivotal connection and pivotal connecting means of that lever and in a direction toward the first lever for pivotally mounting the other part of the power means thereon, the angular relation between a line between the pivot means on the two levers and a line between the pivot means on the first lever and the pivotal connection between the two levers being substantially a right angle when the two levers are collapsed to provide maximum lever extending torque at the beginning of the dumping operation and to provide maximum angular extension of the levers with a minimum decrease in the angular relationship between the pivot means and pivotal connection during the dumping operation.

2. Apparatus for tilting the dump body of a dump vehicle wherein the dump body is pivotally mounted on the chassis of the vehicle comprising, a first lever, a second lever, pivotal connecting means at one end of one of the levers adapted to pivotally connect that lever to the vehicle chassis, pivotal connecting means at one end of the other lever adapted to pivotally connect that lever to the dump body, a pivotal connection between the free ends of the two levers, a fluid motor power means including a piston and a cylinder, pivot means on the first lever adjacent the free end thereof and offset from a line extending through the pivotal connection and pivotal connecting means of that lever and in a direction away from the second lever for pivotally mounting the piston of the power means thereon, and pivot means on the second lever adjacent the free end thereof and offset from a line extending through the pivotal connection and pivotal connecting means of that lever and in a direction toward the first lever for pivotally mounting the forward end of the cylinder of the power means thereon, the angular relation between a line between the pivot means on the two levers and a line between the pivot means on the first lever and the pivotal connection between the two levers being substantially a right angle when the two levers are collapsed to provide maximum lever extending torque at the beginning of the dumping operation and to provide maximum angular extension of the levers with a minimum decrease in the angular relationship between the pivot means and pivotal connection during the dumping operation.

3. Apparatus for tilting the dump body of a dump vehicle wherein the dump body is pivotally mounted on the chassis of the vehicle comprising, a first lever, a second lever, pivotal connecting means at one end of the first lever adapted to pivotally connect the first lever to the dump body, pivotal connecting means at one end of the second lever adapted to pivotally connect the second lever to the vehicle chassis, an ear on the free end of the first lever extending toward the second lever, a pivotal connection between the ear and the free end of the second lever, a bracket adjacent the free end of the second lever extending toward the first lever, a fluid motor power means including a cylinder and a piston extending from the forward end of the cylinder, pivot means for pivotally mounting the piston at the free end of the first lever, and pivot means for pivotally mounting the forward end of the cylinder on the bracket, the angular relation between a line between the two pivot means and a line between the pivot means of the piston and the pivotal connection being substantially a right angle when the two levers are collapsed to provide maximum lever extending torque at the beginning of the dumping operations and to provide maximum angular extension of the levers with a minimum decrease in the angular relationship between the two pivot means and pivotal connection during the dumping operation.

4. Apparatus for tilting the dump body of a dump vehicle wherein the dump body is pivotally mounted on the chassis of the vehicle comprising, a pair of levers, a pivotal connection between an end of each lever for pivotally connecting together the levers so that they may be collapsed and angularly extended, pivotal connecting means at the other ends of each lever adapted to pivotally connect the levers to the dump body and vehicle chassis respectively, power means having two relatively movable parts interposed between the levers adjacent the pivotal connection therebetween for angularly extending and collapsing the levers, pivot means for pivotally mounting one of the movable parts of the power means on one of the levers adjacent the pivotal connection, and pivot means for pivotally mounting the other movable part of the power means on the other lever adjacent the pivotal connection, the angular relation between a line between the pivot means on the two levers and a line between one of the pivot means and the pivotal connection between the levers being substantially a right angle when the two levers are collapsed.

5. Apparatus for tilting the dump body of a dump vehicle wherein the dump body is pivotally mounted on the chassis of the vehicle comprising, a pair of levers, a pivotal connection between an end of each lever for pivotally connecting together the levers so that they may be collapsed and angularly extended, pivotal connecting means at the other ends of each lever adapted to pivotally connect the levers to the dump body and vehicle chassis respectively, power means having two relatively movable parts interposed between the levers adjacent the pivotal connection therebetween for angularly extending and collapsing the levers, pivot means for pivotally mounting one of the movable parts of the power means on one of the levers adjacent the pivotal connection, and pivot means for pivotally mounting the other movable part of the power means on the other lever adjacent the pivotal connection, the relation of the pivot means and the pivotal connection being such that a line through the two pivot means is substantially tangent to a circle passing through one of the pivot means with the pivotal connection as a center when the two levers are collapsed.

6. Apparatus for tilting the dump body of a dump vehicle wherein the dump body is pivotally mounted on the chassis of the vehicle comprising, a pair of levers, a pivotal connection between an end of each lever for pivotally connecting together the levers so that they may be collapsed and angularly extended, pivotal connecting means at the other ends of each lever adapted to pivotally connect the levers to the dump body and vehicle chassis respectively, power means having two relatively movable parts interposed between the levers adjacent the pivotal connection therebetween for angularly extending and collapsing the levers, pivot means for pivotally mounting one of the movable parts of the power means on one of the levers adjacent the pivotal connection, and pivot means for pivotally mounting the other movable part of the power means on the other lever adjacent the pivotal connection, the distance between the two pivot means being less than the distance between one of the pivot means and the pivotal connection when the two levers are collapsed.

7. Apparatus for tilting the dump body of a dump vehicle wherein the dump body is pivotally mounted on the chassis of the vehicle comprising, a pair of levers, a pivotal connection between an end of each lever for pivotally connecting together the levers so that they may be collapsed and angularly extended, pivotal connecting means at the other ends of each lever adapted to pivotally connect the levers to the dump body and vehicle chassis respectively, power means having two relatively movable parts interposed between the levers adjacent the pivotal connection therebetween for angularly extending and collapsing the levers, pivot means for pivotally mounting one of the movable parts of the power means on one of the levers adjacent the pivotal connection, and pivot means for pivotally mounting the other movable part of the power means on the other lever adjacent the pivotal connection, the angular relation between a line between the pivot means on the two levers and a line between one of the pivot means and the pivotal connection between the levers being substantially a right angle when the two levers are collapsed, and the distance between the pivot means being less than the distance between one of the pivot means and the pivotal connection when the two levers are collapsed.

8. Apparatus for tilting the dump body of a dump vehicle wherein the dump body is pivotally mounted on the chassis of the vehicle comprising, a pair of levers, a pivotal connection between an end of each lever for pivotally connecting together the levers so that they may be collapsed and angularly extended, pivotal connecting means at the other ends of each lever adapted to pivotally connect the levers to the dump body and vehicle chassis respectively, power means having two relatively movable parts interposed between the levers adjacent the pivotal connection therebetween for angularly extending and collapsing the levers, pivot means for pivotally mounting one of the movable parts of the power means on one of the levers adjacent the pivotal connection, and pivot means for pivotally mounting the other movable part of the power means on the other lever adjacent the pivotal connection, the relation of the pivot means and the pivotal connection being such that a line through the two pivot means is substantially tangent to a circle passing through one of the pivot means with the pivotal connection as a center when the two levers are collapsed, and the distance between the two pivot means being less than the distance between one of the pivot means and the pivotal connection when the two levers are collapsed.

RICHARD F. DAY.

REFERENCES CITED

The following references are of record in the file of this patent:

UNITED STATES PATENTS

| Number | Name | Date |
|---|---|---|
| 1,552,281 | Edwards | Sept. 1, 1925 |
| 1,810,639 | Burner | June 16, 1931 |
| 2,319,840 | Barrett | May 25, 1943 |